United States Patent [19]

Mizumoto

[11] 3,789,161

[45] Jan. 29, 1974

[54] AMPLIFIER CIRCUITRY FOR TWO-FOUR CHANNEL CARTRIDGE TYPE TAPE PLAYER

[75] Inventor: Yoshiro Mizumoto, Iwaki, Japan

[73] Assignee: Alps Motorola, Inc., Tokyo, Japan

[22] Filed: May 16, 1972

[21] Appl. No.: 253,780

[30] Foreign Application Priority Data

June 25, 1971 Japan.............................. 46-55027

[52] U.S. Cl.179/100.2 Z, 179/1 GQ, 179/100.1 TD, 179/100.2 CA, 274/4 G

[51] Int. Cl.... G11b 21/08, G11b 23/04, H04h 5/00

[58] Field of Search............179/100.2 Z, 100.2 CA, 179/100.1 TD, 1 GQ, 100.2 MD, 100.2 R; 242/55.19 A; 274/4 G

[56] References Cited

UNITED STATES PATENTS

| | | | |
|---|---|---|---|
| 3,640,538 | 8/1972 | Tolar | 179/100.2 CA |
| 3,632,886 | 1/1972 | Scheiber | 179/1 GD |
| 3,532,347 | 10/1970 | Parsons | 179/100.2 CA |
| 3,656,761 | 4/1972 | Laschenski | 179/100.2 CA |
| 3,552,751 | 1/1971 | Kelso | 179/100.2 CA |
| 3,420,965 | 1/1969 | Townsend et al. | 179/100.2 CA |
| 3,531,126 | 9/1970 | Tsukagoshi et al. | 179/100.2 CA |
| 3,426,162 | 2/1969 | Matsumoto et al. | 179/100.2 CA |

*Primary Examiner*—James W. Moffitt
*Assistant Examiner*—Alfred H. Eddleman
*Attorney, Agent, or Firm*—Mueller, Aichele & Gillman

[57] ABSTRACT

A two-four channel tape player including circuitry for switching the mode of operation thereof in accordance with a cartridge received in the player includes four amplifier circuits, each coupled to a magnetic pick-up of a four channel magnetic tape head and to a corresponding speaker. Each amplifier circuit is coupled to a rotary switch through a two-four channel mode selecting switch. The rotary switch is rotatable and operable to two conditions in response to the rotation of a tape head indexing cam of the player. First diodes coupled to the amplifier circuits are forward biased to couple the last-mentioned amplifier circuits to respective speakers upon insertion of a four channel cartridge into the player. For a two channel cartridge, only two of the four pick-ups of the tape head and corresponding amplifier circuits are employed. The amplifier output of a first one of the operational channels is reproduced at a first pair of speakers and the amplified output of the second operational channel is reproduced at the other pair of speakers. Second diodes coupled between the rotary switch wiper and the inputs to the first diodes are provided. Pairs of the second diodes selected in accordance with the position of the rotary switch wiper, are reverse biased to block signals from respective amplifier circuits.

6 Claims, 2 Drawing Figures

AMPLIFIER CIRCUITRY FOR TWO-FOUR CHANNEL CARTRIDGE TYPE TAPE PLAYER

BACKGROUND

This invention relates to switching circuitry for use in a cartridge type tape player for operating the player in a four or two channel mode of operation.

With the advent of four channel sound, it became necessary to provide tape player devices for reproducing sound recorded on four channel tape cartridges. Such devices should, however, be designed not only for playing back four channel tapes, but for playing two channel or stereophonic tapes as well. Also, it is desirable that these tape playing devices are equipped with proper sound reproduction circuitry including sound amplifiers and the like which are operated automatically to a four or two channel mode in accordance with the type of tape cartridge received in the device, thereby eliminating the need for manual operation to the desired mode.

Tape devices of the above type are known in the art, see co-pending U.S. patent application, Ser. No. 243,006, filed Apr. 11, 1972, in the name of Yoshiro Mizumoto and assigned to the same assignee as the instant application.

SUMMARY

It is an object of the present invention to provide a new and improved tape playing device for playing both four and two channel tape cartridges which includes circuitry for switching the mode of operation thereof in accordance with the type of cartridge received in the device.

It is a further object of the present invention to provide a tape player device of the above described type which includes sound amplification circuit which is operable automatically to a four or two channel mode in accordance with the type of tape cartridge received in the device.

Briefly, a preferred embodiment of the two-four channel tape playing device according to the invention comprises circuitry including four amplifier arrangements each coupled electrically to a magnetic pick-up portion of a four channel magnetic tape head and to a corresponding speaker or sound reproducing element. Each of the amplifier arrangements is also connected to a rotary switch through a two-four channel mode selecting switch operated to one of two positions, i.e., two or four channel setting, in accordance with the receipt of a two or four channel cartridge in the player, respectively. The rotary switch is rotatable with a tape head indexing cam operable to move the tape head to upper and lower positions with respect to the magnetic tape in the cartridge inserted into the player.

Upon insertion of a four channel cartridge into the player, first diodes coupled to each of the amplifier arrangements are forward biased to couple the last-mentioned arrangements to respective speakers.

In the event a two channel cartridge is received in the player, only two of the pick-up areas of the tape head are employed, thus, only those corresponding amplifier arrangements are operated. In the latter case, the amplified output of a first one of the two operational channels is reproduced at a first pair of speakers and the output from the other channel is reproduced at a second pair of speakers. To operate the selected amplifier arrangements, second diodes coupled between the wiper of the aforementioned rotary switch and the input to the above described diodes, are provided. With the tape head in a first position the rotary switch wiper is coupled to ground potential to forward bias two of the second diodes. The latter in turn back-biases corresponding ones of the first-mentioned diodes to block the signals from respective amplifier arrangements. The remaining two second diodes are unoperated to maintain the corresponding first-mentioned diodes forward biased so that the output from corresponding amplifier arrangements is coupled to a respective speaker as well as one of the other remaining speakers. As mentioned, the two amplifier arrangements which are rendered operable as described heretofore are selected in accordance with the positioning of the wiper of the rotary switch coupled to the tape head indexing cam. Thus, when the tape head is moved to the second position, the two previously unoperated second diodes are operated to block sound from the amplifier arrangements to the speakers and the two previously operated diodes are rendered unoperated to permit the passage of sound from corresponding amplifier arrangements to the speaker elements.

DETAILED DESCRIPTION

Figure 1:
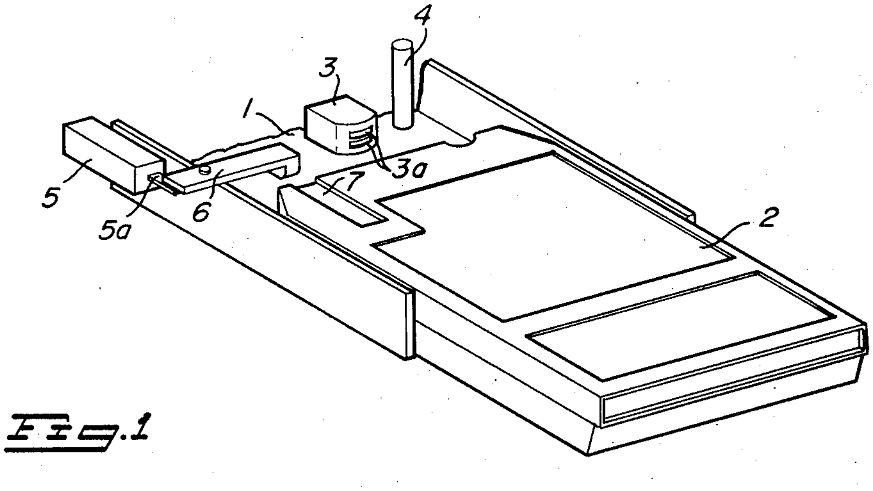
FIG. 1 is a perspective view of a portion of a cartridge tape player incorporating two-four channel switching circuitry according to the invention.

The invention will now be described with respect to the embodiment thereof shown in the drawing. In FIG. 1, numeral 1 designates a main body of a cartridge type tape player, numeral 2 shows a cartridge to be inserted into the main body 1 and numeral 3 is a magnetic tape head mounted on the main body. The height of the tape head 3 is changeable to two positions with respect to a magnetic tape within cartridge 2, to align the magnetic pick-ups of the tape head with the various channels on the tape. The tape head is movable by means of a rotary cam (not shown). The tape head is capable of reproducing simultaneously each of four channels, independently.

Numeral 4 designates a capstan shaft for driving the tape through cartridge 2 when the latter is inserted into the player main body 1. Numeral 6 designates a lever arm fitted rotatably on main body 1 which operates a press switch 5 in response to the insertion of a predetermined type cartridge into the player. If the cartridge is a two channel type having no recess 7, such as that shown on the cartridge 2 of the drawing, lever 6 is engaged by the cartridge and is rotated, causing slider 5*a* of switch 5 to be pushed. If the cartridge is of the four channel type including a recess 7, lever 6 is not engaged and switch 5 is maintained unoperated.

Figure 2:
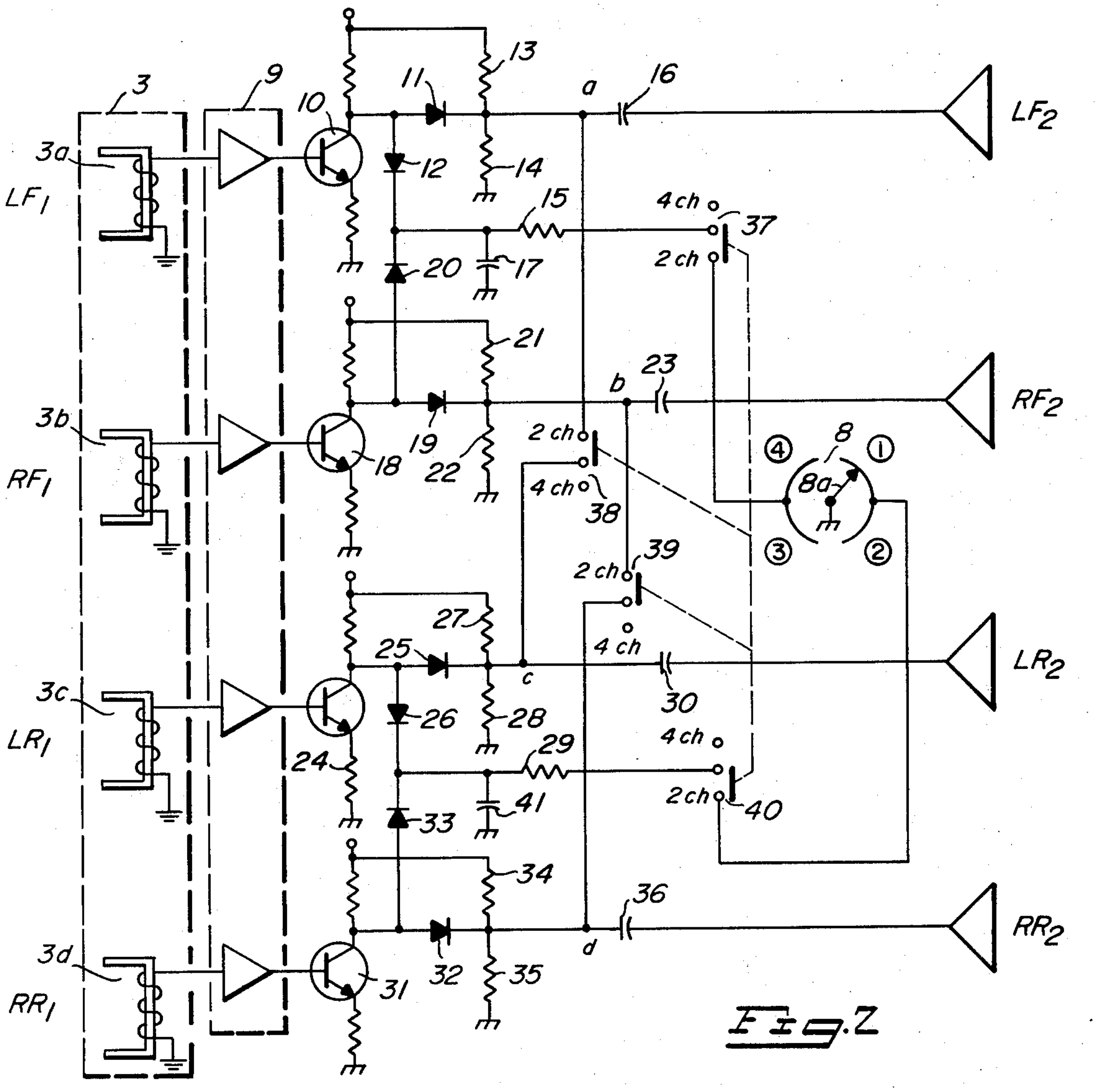
FIG. 2 is a schematic diagram of the switching circuitry according to the invention.

Referring to FIG. 2, it can be seen that magnetic tape head 3 includes four pick-up areas designated LF1, RF1, LR1, RR1. Numeral 8 designates a rotary panel switch mounted coaxially with a cam (not shown) which is rotatable to adjust the magnetic tape head up and down with respect to the tape channels. Numeral 9 indicates a first stage amplifier for amplifying the input signal from magnetic tape head 3. The portions of the input signal are established at magnetic pick-ups LF1, RF1, LR1, RR1. Numerals 10, 18, 24 and 31 show the second stage amplifying transistors; numerals 11 and 12, 19 and 20, 25 and 26, 32 and 33 indicate switching diodes coupled to the collector or output of transistor 10, 18, 24 and 31, respectively; numerals 13, 14, 15; 21, 22; 27, 28, 29; 34, 35 show bias adjusting resistors for the last-mentioned diodes; numerals 16, 23, 30 and 36 illustrate coupling condensers; numerals 17 and 41 designate noise suppressing condensers; and numerals 37, 38, 39 and 40 represent changeover, interlinked two-four channel switch contacts operated by switch 5 (FIG. 1).

The operation of the circuit will now be described. With magnetic tape head 3 in a first, upper position, wiper contact 8*a* of panel switch 8 makes contact with terminal 1. Rotation of the tape head indexing cam to lower tape head 3 to a second position, moves wiper 8*a* to terminal 2 of the panel switch. When the tape head is raised again, the contact wiper 8*a* is moved into engagement with terminal 3 and when lowered again into contact with terminal 4.

Upon insertion of a four channel cartridge including a notch 7 therein, into the main body 1 of the player, lever 6 is avoided and switch 5 remains in the four channel position. Thus, interlinked contacts 37, 38, 39 and 40 remain in the four channel setting and each of the connecting circuits is open (see FIG. 2).

When the magnetic tape head 3 is in the upper position and contact wiper 8a is in contacting engagement with terminal 1, as shown in FIG. 2, or when the tape head is lowered and the contact wiper 8*a* makes contact with terminal 2, switching diode 11 is forward biased so that the signal picked up at magnetic pick-up LF1 and amplified by amplifying circuitry including amplifier 9 and transistor 10, is passed to output element LF2. Likewise, the signal of RF1 is provided as an amplified output at element RF2 because switching diode 19 is forward biased. Similarly, switch diodes 25 and 32 are forward biased to pass signals to output elements LR2 and RR2 which are received at LR1 and RR1 and amplified by corresponding amplifier circuitry, respectively. Furthermore, when the switch wiper 8a is in contact with terminals 3 and 4 of panal switch 8, the switching diodes 11, 19, 25 and 32 remain in a forward biased condition to pass amplified signals to outputs LF2, RF2, LR2 and RR2, respectively.

Upon insertion of a two channel cartridge into the main body of the player, having no notch 7 therein, the cartridge engages lever 6 to operate changeover switch 5 thereby positioning switch contacts 37, 38, 39 and 40 to the two channel setting. If the contact wiper 8*a* is in contact with terminal 1 of the panel switch 8, the collector of amplifying transistor 24 coupled to magnetic pick-up LR1 is grounded through diode 26, series resistor 29 and panel switch wiper 8*a*. Forward biasing diode 26 lowers the voltage at the input side of switching diode 25 with respect to the voltage at the output side thereof, to reverse bias switching diode 25. Since the switching diode is reverse biased, the signal from LR1 is blocked thereby and does not appear at point *c*. Similarly, the diode 33 is forward biased and switching diode 32 is reverse biased to block signals from RR1 to prevent the passing thereof beyond point d.

With the contact 8*a* in engagement with terminal 3 or 4 of the contact switch 8, diodes 12 and 20 are not conducting and therefore diode 11 is forward biased so that signals from LF1 appear as an amplified output at point *a*. With contacts 38 in the two channel setting, the amplified signals also appear at point *c*. Thus, the amplified output from LF1 appears both at LF2 and LR2.

In the same manner, since switching diode 19 is forward biased, the amplified output from RF1 at point *b* also appears at point *d* through switching contacts 39. Thus, the signal from RF1 appears both at RF2 and RR2.

When the contact 8*a* of panel switch 8 engages terminal 2, the signals of LR1 and RR1 do not appear at points *c* and *d*, respectively. Thus, signals from LF1 are amplified and appear at LF2 and LR2 and signals at RF1 are amplified and appear at RF2 and RR2 as outputs.

With the panel switch wiper 8*a* in contact with terminals 3 or 4, the collector of amplifying transistor 10 is grounded at the panel switch through switching diode 12, the series resistor 15 and changeover switch contact 37. At this time, switching diode 11 is reverse biased and is in the off state to block signals received at LF1 from point *a*. Similarly, signals received at RF1 do not appear at point *b*.

Switching diode 25 is at this time forward biased so that signals at LR1 appear at point *c*. The signals from LR1 are amplified and passed through switch contacts 38 and appear both at LF2 and LR2. Similarly, the amplified signal of RR1 appears at RR2 and RF2.

In summary, in the circuit according to the invention, when a four channel tape cartridge is inserted into the tape player, the signals of LF1, RF1, LR1, and RR1 are amplified and passed by corresponding switching diodes to outputs LF2, RF2, LR2 and RR2, respectively. On the other hand, when a two channel tape cartridge is inserted, the signals at LF1 are passed to both LF2 and LR2 and the signals at RF1 are passed to both RF2 and RR2, when the panel switch wiper is contacting terminals 1 or 2. Any signals from LR1 and RR1 are blocked out at this time. Furthermore, when the wiper 8a is in contacting engagement with terminals 3 or 4, signals picked up at LR1 and RR1 are amplified and passed to LF2, LR2 and RF2, RR2, respectively, while any signals at LF1 and RF1 are blocked. The latter is accomplished by reverse biasing selected diodes to block signals from corresponding magnetic pick-ups of the tape head 3.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A cartridge type tape player adapted to receive and play four and two channel type cartridges, said player including in combination:

magnetic tape head means having four magnetic pick-up areas, said tape head means being movable between two positions upon the insertion of said four or two channel tape cartridges into said player, said movement aligning said pick-up areas with selected channels on said tape, amplifier means including four amplifier circuits each connected to one of said pick-up areas on said tape head, each of said amplifier circuits including an electron control valve having an output, four output means each connected to one of said amplifier circuits for receiving signal from said amplifier circuits for audible reproduction thereof, switching means coupled to said amplifier circuits and movable between a first and second positions in accordance with the receipt of a four and two channel tape cartridge in said player, respectively, first diodes each having an input and an output thereon, one of said diodes being interposed between the output of a corresponding one of said electron control valves and one of said four output means, the inputs of said first diodes being coupled to the outputs of each of said electron control valves and the outputs of said diodes being coupled to corresponding output means, and second diodes, one of which is interposed between the input of a corresponding one of said first diodes and said switching means, said first diodes being biased in a forward direction to pass output signals from respective amplifier circuits to corresponding output means upon movement of said switching means to said first position, and a predetermined pair of said second diodes being biased in a forward direction to reverse bias corresponding ones of said first diodes to block signals emanating from respective amplifier circuits from corresponding output means upon movement of said switching means to said second position.

2. A cartridge type tape player as claimed in claim 1 wherein said switching means includes a switching device movable to a plurality of positions and operable in first predetermined ones of said positions, only when said switching means is in said second position, to forward bias a first pair of said second diodes to reverse bias corresponding ones of said first diodes and in other predetermined ones of said positions to forward bias a second pair of said second diodes to reverse bias corresponding ones of said first diodes.

3. A cartridge type tape player as claimed in claim 2 further including tape head indexing means for moving said magnetic tape head to one of said two positions with respect to said tape for aligning said pick-up areas with predetermined tape channels thereon, and wherein said switching device is movable to said plurality of positions in accordance with the movement of said tape head to said two positions.

4. A cartridge type tape player as claimed in claim 2 wherein said switching means is operable in said second position to pass signals emanating from a first amplifier circuit to one of said output means from which signals from a corresponding amplifier circuit are blocked and to pass signals emanating from a second amplifier circuit to the other one of said output means from which signals from a corresponding amplifier circuit are blocked.

5. A cartridge type tape player adapted to receive and play four and two channel tape cartridges, said player including in combination:

magnetic tape head means having four magnetic pick-up areas, means coupled to said tape head means for movement thereof between two positions upon the insertion of said four or two channel tape cartridges into said player, said movement aligning said pick-up areas with various ones of said channels on said tape, amplifier means including four amplifier circuits, each connected to one of said pick-up means on said tape head, four output means for receiving signals from said amplifier circuits for audible reproduction thereof, switching means coupled to said amplifier circuits including contacts actuable between first and second positions in accordance with the receipt of a four or two channel tape cartridge in said player, respectively, said four output means being separated electrically from each other upon operation of said contacts to said first position and predetermined pairs of said output means being coupled together electrically upon operation of said contacts to said second position, first diodes each having an input and output, one of said first diodes being interposed between the output of a corresponding one of said amplifier circuits and one of said four output means, the inputs of said first diodes being coupled to the outputs of respective amplifier circuits and the outputs of said diodes being coupled to corresponding output means, a switching device coupled to said tape head moving means and operable to two predetermined conditions in accordance with the movement of said tape head to said two positions to actuate said switching means between said first and second positions, and second diodes, one of which is interposed between the input of a corresponding one of said first diodes and said switching device, predetermined pairs of said second diodes being forward biased in accordance with the condition of said switching device when said switching contacts are in said second position, to reverse bias corresponding ones of said first diodes to block signals from respective amplifier circuits from corresponding output means, whereby signals from unblocked amplifier circuits are passed to said coupled output means, respectively.

6. A cartridge type tape player as claimed in claim 5 further including tape head indexing means for moving said magnetic tape head to one of said two positions with respect to said tape, said tape head indexing means including a rotary cam having a plurality of cam surfaces corresponding to the two positions of said tape head and wherein said switching device includes a rotary switch having a wiper coupled to a source of electrical potential and terminals, said wiper being rotatable with said indexing cam into contacting engagement with said terminals, predetermined ones of said terminals being coupled to a first pair of said amplifier circuits and other predetermined ones of said terminals being coupled to the other pair of said amplifier circuits, whereby upon movement of said wiper into engagement with one of said first predetermined ones of said terminals, a potential is applied to corresponding ones of said second diodes for forward biasing thereof to block signals from respective amplifier circuits and upon movement of said wiper into engagement with one of said other predetermined ones of said terminals, a potential is applied to other corresponding ones of said second diodes for forward biasing thereof to block signals from respective amplifier circuits.

* * * * *